3,739,045
DICYANOPHENYL THIOPHOSPHATES
Heinrich Adolphi, Limburgerhof, Heinz Eilingsfeld, Frankenthal, and Manfred Patsch and Ernst Schaffner, Ludwigshafen, Germany, assignors to Badische Anilin- & Soda-Fabrik Aktiengesellschaft, Ludwigshafen (Rhine), Germany
No Drawing. Filed June 3, 1971, Ser. No. 149,780
Claims priority, application Germany, June 20, 1970, P 20 30 545.7
Int. Cl. C07f 9/18; A01n 9/36
U.S. Cl. 260—940         3 Claims

ABSTRACT OF THE DISCLOSURE

New and valuable substituted dicyanophenyl thiophosphates having a good insecticidal action and a process for controlling insects with these compounds.

The present invention relates to new and valuable substituted dicyanophenyl thiophosphates having a good insecticidal action and the use of these compounds as pesticides.

It is known to use cyanophenyl thiophosphates as insecticides. However, their action is unsatisfactory.

We have now found that subsituted dicyanophenyl thiophosphates of the formula

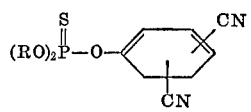

where R denotes lower alkyl (methyl, ethyl, propyl, butyl), have a good insecticidal action.

This action is particularly in evidence when the compounds are used to combat caterpillars, bettles and their larvae, and larvae of the sawfly. The new active ingredients are therefore particularily suitable for protecting cotton fields, fruit plantations, forestry nurseries and vegetable crops against insect attack. Application rates range from 0.5 to 2.5 kg. of active ingredient per hectare.

The new active ingredients may be prepared by reacting oxybenzadinitriles with thiophosphoric ester chlorides in the presence of bases at temperatures of from 30° to 120° C. Suitable solvents are aromatic hydrocarbons or ethers, dioxane, tetrahydrofuran, dimethylformamide, water and acetonitrile.

EXAMPLE 1

28.8 parts (by weight) of 4-hydroxyphthalodinitrile and 20 parts of potassium carbonate are boiled under reflux for 2 hours in 400 parts of acetonitrile with 37.8 parts of thiophosphoric-O,O-diethyl ester chloride. Suction filtration is effected, the filtrate is concentrated in vacuo, and 46 parts of a yellow oil is isolated which is identified by nuclear resonance spectroscopy as being

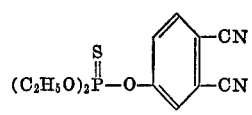

EXAMPLE 2

28.8 parts of 4-hydroxyphthalodinitrile and 20 parts of potassium carbonate are boiled under reflux for 3 hours in 400 parts of tetrahydrofuran with 35 parts of thiophosphoric-O,O-dimethyl ester chloride. The precipitate is suction filtered and the filtrate concentrated in vacuo.

Yield: 40 parts of the following compound, identified by nuclear resonance spectroscopy:

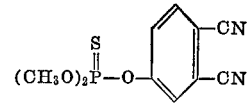

The following compounds may be prepared analogously:

O,O-dimethyl-2,5-dicyanophenyl thiophosphate,
O,O-diethyl-3,5-dicyanophenyl thiophosphate.

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling points higher than 150° C., e.g. tetrahydronaphthalene or alkylated naphthalenes, or organic liquids having boiling points higher than 150° C. and having one or more than one functional group, e.g. the keto group, the ether group, the ester group or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. kieselguhr, talc, clay or fertilizers.

For the following experiments, the two prior art active ingredients (I) 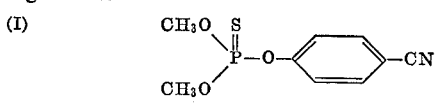

(DAS 1,207,398)

(II) 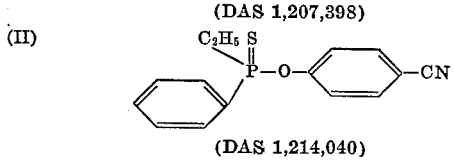

(DAS 1,214,040)

and the new active ingredient

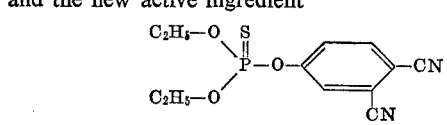

prepared as in Example 1, where used.

EXAMPLE 3

Spray test on aphids (*Aphis fabae*) on *Vicia faba*

The aqueous emulsions at various concentrations are sprayed from a constant distance onto infected bean plants. The kill rate is determined after 24 hours.

Results

Active ingredient I: more than 95% killed at a concentration of 0.1% by weight of active ingredient in the aqueous emulsion.

Active ingredient II: more than 95% killed at a concentration of 0.02% by weight of active ingredient in the aqueous emulsion.

Active ingredient of Example 1: more than 95% killed at a concentration of 0.01% by weight of active ingredient in the aqueous emulsion.

EXAMPLE 4

Spray test on spinning mites (*Tetranychus telarius*) on bush beans

The treatment method is the same as in Example 1. The action is determined after 6 and 12 days. That active ingredient concentration is considered to be effective at which more than 95% of all stages are killed.

Results

Active ingredient:    Concentration (percent by weight in the aqueous emulsion

I    0.1 ineffective.
Example 1    0.025 effective.

EXAMPLE 5

Continuous contact action on oriental cockroaches (*Blatta orientalis*)

The interior of 1 liter glasses is evenly sprayed with an acetonic solution of the active ingredients. After the solvent has evaporated, adult cockroaches are placed in the glasses. The action is assessed after 48 hours.

Results
Active ingredient II:
0.1 mg./glass effective
0.05 mg./glass ineffective
Active ingredient Example I:
0.05 mg./glass effective

EXAMPLE 6

Action on *Drosophila melanogaster* larvae

The active ingredients are evenly stirred into the food of the larvae. Subsequently, about 30 adults per glass lay eggs. The development of the larvae is assessed after 10 days.

Results

Active ingredient:    Concentration of the active ingredient in the food

I    {0.5 p.p.m. toxic. / 0.25 p.p.m. ineffective.
II    {0.25 p.p.m. toxic. / 0.125 p.p.m. ineffective.
Example 1    0.125 p.p.m. toxic.

These experiments demonstrate the superiority of the new active ingredients over prior art compounds.

EXAMPLE 7

90 parts of by weight of the compound of Example 1 is mixed with 10 parts by weight of N-methyl-α-pyrrolidone. A mixture is obtained which is suitable for application in the form of very fine drops.

EXAMPLE 8

20 parts by weight of the compound of Example 2 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 9

20 parts by weight of the compound of Example 1 is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 10

20 parts by weight of the compound of Example 1 is dissolved in a mixture consisting of 25 parts by weight of cyclohexanol, 65 parts by weight of a mineral oil fraction having a boiling point between 210° and 280° C., and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 11

20 parts by weight of the compound of Example 2 is well mixed with 3 parts by weight of the sodium salt of diisobutylnaphthalene-α-sulfonic acid, 17 parts by weight of the sodium salt of a lignin-sulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1% by weight of the active ingredient.

EXAMPLE 12

3 parts by weight of the compound of Example 1 is intimately mixed with 97 parts by weight of particulate kaolin. A dust is obtained containing 3% by weight of the active ingredient.

EXAMPLE 13

30 parts by weight of the compound of Example 2 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:

1. A substituted dicyanophenyl thiophosphate of the formula

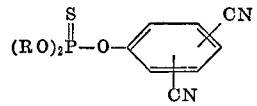

where R denotes lower alkyl and the —CN groups are in the 3,4; 3,5; or 2,5 positions on the phenyl group.

2. O,O-diethyl-3,4-dicyanophenyl thiophosphate.
3. O,O-dimethyl-3,4-dicyanophenyl thiophosphate.

References Cited
UNITED STATES PATENTS 2,828,241    3/1958    Birum    260—940 X LEWIS GOTTS, Primary Examiner A. H. SUTTO, Assistant Examiner U.S. Cl. X.R.

424—210